March 11, 1969  H. ALBINGER, JR  3,432,696

TORSION WIRE TENSION SPRING FOR A BATTERY-OPERATED CLOCK

Filed May 18, 1967

Inventor:
Harry Albinger Jr.
by Leonard J Platt
Attorney

United States Patent Office 3,432,696
Patented Mar. 11, 1969

3,432,696
TORSION WIRE TENSION SPRING FOR A BATTERY-OPERATED CLOCK
Harry Albinger, Jr., Ashland, Mass., assignor to General Electric Company, a corporation of New York
Continuation-in-part of application Ser. No. 522,198, Jan. 21, 1966. This application May 18, 1967, Ser. No. 639,398
U.S. Cl. 310—36                5 Claims
Int. Cl. H02k 33/00, 33/02

---

ABSTRACT OF THE DISCLOSURE

An electronic torsion wire clock wherein one of the ends of a torsion wire is connected to a unique leaf spring construction for adjusting the tension of the torsion wire. The leaf spring includes two extensions, each of which provides a portion of the total tension supplied by the spring to the torsion wire. The first extension supplies the greater portion of the total tension supplied to the torsion wire and is initially adjusted and fixed. The second extension of the spring is provided with a threaded bushing for introducing small accurate adjustments in the tension of the torsion wire. In this manner, a coarse and fine adjustment in the tension supplied to the torsion wire is achieved.

---

Background of the invention

This invention relates to torsion member clocks and, more particularly, to an improved mechanism for adjusting the tension of the torsion member in order to adjust the oscillation frequency of the torsion member clock. The application is a continuation-in-part of my application Ser. No. 522,198, filed Jan. 21, 1966.

A torsion member clock generally comprises an electrically operated permanent magnet motor which drives the hands of the clock at a rotation rate which is controlled and synchronized by an electrical oscillator, the oscillation rate of the electrical oscillator being controlled by oscillations of a mechanical oscillator. The mechanical oscillator generally comprises a torsion member in the form of a wire having a permanent magnet mounted thereon and being positioned within a magnetic field. The magnetic field is established by an electric coil which is connected in a regenerative feedback circuit with the electrical oscillator. As the torsion member oscillates at its mechanical frequency, oscillation of the permanent magnet mounted on the torsion member induces signals in the coil and therefore the electrical oscillator, which signals are fed to the control circuit for the motor which drives the hands of the clock. In turn, the electrical oscillations induced in the coil by the electrical oscillator causes the permanent magnet to maintain its motion thereby maintaining the impetus on the torsion member so that it continues to oscillate at its mechanical frequency. Since the torsion member oscillates at a constant frequency depending only upon the mechanical characteristics of the torsion member itself, it can be seen that the rate of rotation of the clock hands can be accurately controlled by adjusting the mechanical characteristics of the torsion member.

In order to produce a more accurate torsion member clock, it is desired to obtain a means for adjusting the mechanical oscillation frequency of the torsion member as nearly precisely as possible.

Summary of the invention

It is therefore an object of this invention to provide an improved means for adjusting the mechanical oscillation rate of a torsion member in a torsion member clock.

It is another object of this invention to provide an improved means for varying the tension on a torsion member to obtain greater accuracy in a torsion member clock.

These and further objects of this invention are obtained in one form in a torsion member clock in which the torsion member is supported by two support members, the permanent magnet mounted on the torsion member being disposed between the two support members. While one of the support members frictionally secures one end of the torsion member without providing any means for adjusting the tension thereof, the other one of the support members is connected to a tension spring including two extensions, each of which provides a portion of the total tension supplied by the spring to the torsion wire. The first extension member of the spring supplies the greater portion of the total tension supplied to the torsion member and is initially adjusted and then fixed. The second extension of the spring is provided with means for adjusting its tension and therefore the tension supplied by the spring to the torsion member. This latter mentioned means generally comprises a threaded bushing and adjusting screw whereby large adjustments to it produce only small accurate adjustments in the tension in the second extension member of the spring. In this manner, a coarse and fine adjustment in the tension supplied to the torsion member is provided. Since the oscillating frequency of the torsion member is controlled by the tension thereon, an improved frequency adjusting means is provided.

Brief description of the drawing

For a more detailed description of this invention, reference is made to the following specifications and the accompanying drawings of which.

Description of the preferred embodiment

Figure 1:
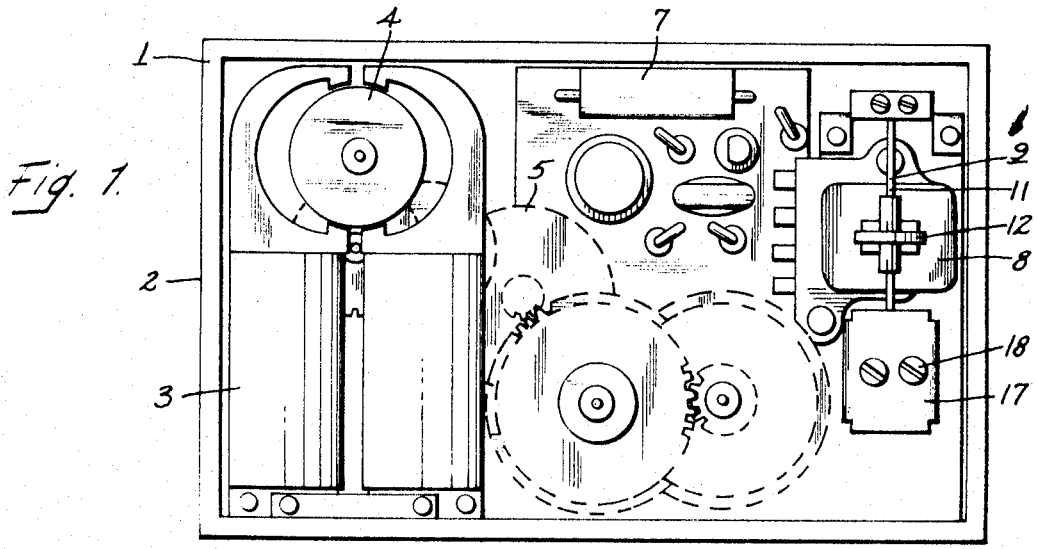
FIG. 1 is an elevation view of sections having the general components of a torsion member clock.

Referring to FIG. 1 a torsion member clock 1 is shown including a casing 2 and a pulse or AC permanent magnet motor 3 having a rotor 4 which is coupled in driving engagement with a gear train 5 for driving a pair of clock hands (not shown) by means of the concentric shaft mechanism 6. The rotor 4 is powered by electrical signals from an electrical oscillator circuit 7. A coil 8 is electrically connected to the electrical oscillator circuit 7 and is positioned adjacent to an electromagnetic-mechanical torsion member mechanism 9. For a more detailed description of a torsion member clock and in particular the motor and the electrical oscillator circuit in a torsion member clock reference is made to United States Patent 3,142,012—Petrides—July 21, 1964, assigned to the same assignee as the instant invention.

Figure 2:
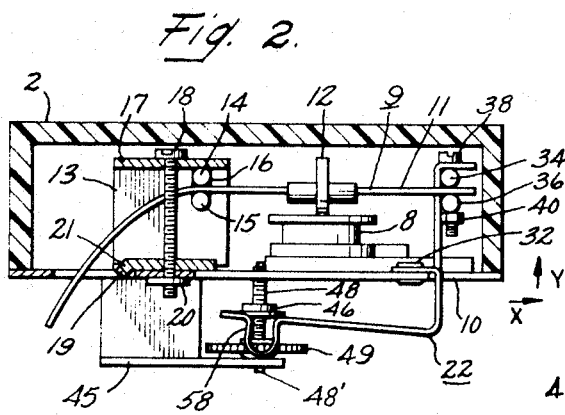
FIG. 2 is a side view of a torsion member clock showing only the torsion member mechanism.

The torsion member mechanism 9 is seen more clearly in FIG. 2 where there is shown three sides of the casing 2 of the torsion member clock 1 with a fourth side 10 comprising a base support member for supporting various elements of the torsion member mechanism 9. The torsion member mechanism 9 includes a wire 11 upon which a permanent magnet 12 is fixedly secured adjacent the coil 8 which is part of the electrical oscillator circuit 7 of the torsion member clock 1. The torsion wire may be of a rectangular cross section or any other convenient cross section so long as it exhibits acceptable torsion characteristics for producing uniform torsional oscillations. One end of the torsion wire 11 is secured to a first support member 13 by a pair of pins 14 and 15 riding in a slot 16 provided in opposite sides of the support member 13. The torsion wire 11 is held in frictional engagement between the pins 14 and 15 by the action of a top plate 17 being forced down on the top of the pin 14 by a clamping bolt 18. The clamping bolt 18 fits through an aperture in the top plate 17 and through another aperture in the bottom side 19 of the support member 13 and is secured to the base support member 10 by means of a nut 20. The bottom side 19 is included with ears 21 which can ride in slots provided in the base member 10 for a lateral adjustment of the support member 13 and therefore the torsion wire 11.

Figure 3:
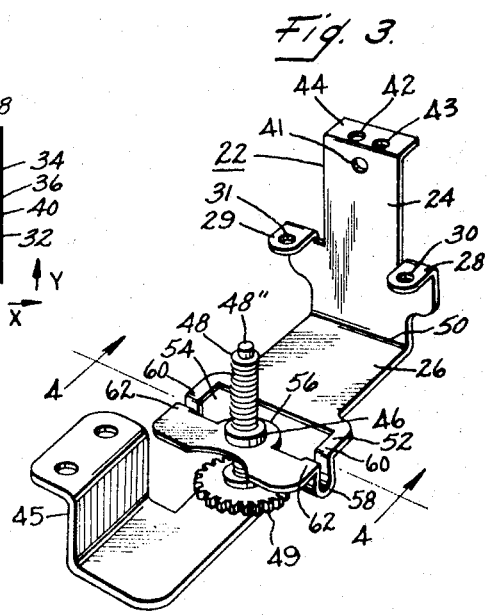
FIG. 3 is a perspective view of the tension spring according to the teachings of this invention.
Figure 4:
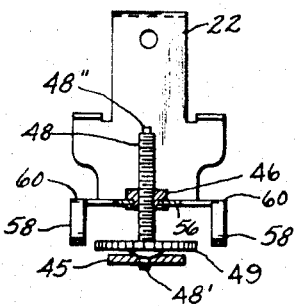
FIG. 4 is a sectional view taken along the lines 4—4 or FIG. 3 and shows a threaded bushing and screw adjusting means according to further teachings of this invention.

According to this invention, there is combined with the aforedescribed torsion wire 11, a uniquely designed and positioned leaf spring 22 for accurately adjusting the tension on the torsion wire 11. As shown more particularly in FIG. 3, the spring may be stamped from a single piece of flat spring material. The spring comprises a generally vertical portion 24 for providing a coarse adjustment in the tension of the torsion wire 11, and a generally horizontal portion 26 for achieving an accurate fine adjustment in the tension of the torsion wire 11. A pair of tabs 28 and 29 are struck from the generally vertical portion of the spring for securing the tension spring 22 to the base member 10. As illustrated, the tabs may be placed on top of the base plate 10 and rivets 32 or other suitable securing means may be conveniently passed through apertures 30 and 31 to fix the spring 22 to the base member.

A generally horizontal flange 44 is formed at the top of the vertical portion of the adjusting spring 22, and a generally centrally located aperture 41 is formed in the vertical portion 22 for achieving a secure and uniform connection of the opposite end of the torsion wire 11 to my unique spring member 22. As illustrated more particularly in FIG. 2, the opposite end of the torsion wire 11 is passed through the central aperture 41 and is frictionally secured to the vertical portion of spring 22 by a pair of pins 34 and 36. As shown, the pins are clamped together by a pair of bolts and nuts 38 and 40, the bolts being threaded through holes in the pins 34 and 36 and through complementary apertures 42 and 43 formed in the generally horizontal flange 44. With this construction, the pins 34 and 36 tightly grip the torsion wire 11 and abut the outer surface of the vertical portion 24 of the leaf spring thereby insuring a good positive connection. Moreover, the wire 11 is urged axially away from its connection with bars 14 and 15 without tendency to move to the right or left since it is threaded through the centrally located aperture 41. A predetermined amount of tension can be imparted to the torsion wire 11 by proper adjustment of the tension in the first extension member 24 prior to securing it at the pair of flange members 28 and 29 to the base member 10 with the rivets 32. This tension adjustment is usually rather coarse and is selected to impart most of the total tension desired on the torsion wire 11 leaving only a small amount of extra tension to be supplied by the fine adjustment mechanism to be hereinafter described.

The generally horizontal portion 26 of the tension spring 22 is designed to supply a small amount of extra tension to the total tension imparted by the tension spring 22 to the torsion wire 11. A threaded bushing 46 is riveted in a centrally located aperture at the end of the horizontal arm 26 for cooperating with an adjusting screw 48. As shown more particularly in FIGS. 2 and 3, a bracket 45 is fixed to the base member 10 for receiving a reduced end portion 48' of the adjusting screw 48, and the other end 48" of the screw 48 is also reduced in diameter for reception by an aperture formed in the base member 10. An adjusting gear 49 having a plurality of gear teeth at its outer periphery is fixed to the adjusting screw 48 for rotating the screw within bushing 46. Accordingly, a screw driver or similar tool may be inserted through an aperture in the clock casing (not shown) and between adjacent teeth of gear 49 for rotating the gear 49 and adjusting screw 48.

With this arrangement, the tension of the wire 11 may be adjusted by rotating the adjusting screw 48 clockwise or counter-clockwise in the threaded bushing 46. By providing a very fine pitched screw thread in the threaded bushing 46, it will require many turns of the screw bolt 48 to obtain a small variation in the angular bend 50 of the tension spring 22, thus providing a fine adjustment of the total tension imparted to the torsion wire 11. For example, in the preferred embodiment, there are 80 threads per inch.

The horizontal portion 26 of the spring 22 is uniquely shaped and formed in the vicinity of the threaded bushing 46 for maintaining the torsion wire 11 at a desired length and torsion at relatively large amplitudes of rotational oscillation of the torsion wire magnet 12. It has been observed that the tension of the torsion wire 11 tends to increase undesirably at high rotational amplitudes. My uniquely shaped spring portion 52 has been designed to obviate this difficulty. As illustrated more particularly in FIG. 3, an enlarged generally rectangular opening 54 is stamped in the horizontal portion 26 of the torsion wire leaving a small semi-circular portion 56 which extends inwardly for receiving bushing 46. The spring member is then bent to form two very flexible U-shaped portions 58 at the sides of the enlarged opening 54. As shown in FIG. 2, the center of the threaded bushing 46 and the axis of the screw bolt 48 are in a plane which equally divides each of the U-shaped portions 58. It can be appreciated that the U-shaped portions 58 are very weak in the direction indicated by the arrow X and, thus, the spring gradient in this direction is very low. Accordingly, any tendency to increase tension on the torsion wire due to high rotational amplitudes of the magnet 12 will merely tend to pull the portions 60 in the X direction and cause little additional tension on the wire as the amplitude of rotation increases. However, as the tension adjusting screw 48 is moved in the Y direction, the portions 60 and 62 immediately adjacent to the U-shaped sections 58 will closely follow each other as the bolt 48 is rotated because the spring is stiff in this direction thereby accomplishing a uniform adjustment. In addition, the unique narrow U-shaped sections of my improved spring also act as a decoupling between the spring 22 and the bushing 46 and tend to equalize the forces on the bushing as the bushing is moved upwardly or downwardly with respect to the base 10 by rotation of the screw bolt 48. It can be appreciated that movement of the bushing upwardly will tend to increase the width of the neck portion of the U-shaped portions, while movement of the bushing downwardly with respect to the base 10 will tend to decrease the width of the neck of the U-shaped sections. In other words, the U-shaped portions permit the bushing 46 and the circular portion 56 of the spring to remain parallel to base plate 10 as the bushing is adjusted upwardly or downwardly. Thus, my unique U-shaped sections function as a decoupling construction reducing sidewise forces on the screw bolt 48 as it is rotated within the threaded bushing 46.

It is therefore apparent that my invention provides a dual adjustment of the tension on the torsion member of a torsion member clock by use of a unique integrally formed tension spring 22. With this device, both a coarse and a fine adjustment of the frequency of rotational oscillation of a torsion member 11 are obtained.

While a preferred embodiment of the invention has been shown, various other modifications and embodiments of the invention will be apparent to those skilled in the art, and it is intended to cover by the appended claims all such modifications falling within the true spirit and scope of this invention.

What I claim as new and desire to secure by Letters Patent of the United States is:

1. In a torsion member clock having an electric motor, a base member and an adjustable electromagnetic-mechanical oscillator for controlling the speed of the electric motor comprising:
   (a) a torsion member, said torsion member having a magnet mounted thereon for torsional oscillation within a magnetic field,
   (b) a first support securing a first end of said torsion member,
   (c) a second support for securing the other end of said torsion member and for adjusting the frequency of oscillation of said torsion member, said second support comprising
     (1) a leaf spring including first and second portions arranged at an angle with respect to each other, the other end of said torsion wire being connected to said first portion and said first portion including connecting means for providing tension on said torsion member, and
     (2) said second portion of said second leaf spring support comprising a threaded bushing fixed to said second portion of said leaf spring.

2. A torsion member clock as recited in claim 1 wherein said second portion of said spring includes two relatively thin U-shaped portions between said bushing and said first portion of said spring whereby said torsion wire is maintained at its desired length and tension during relatively large amplitudes of rotational oscillation of the torsion wire magnet.

3. A torsion member clock as recited in claim 1 wherein said first portion of said second support includes tab means arranged generally parallel to said second portion of said spring support for connecting said spring support to said torsion member clock and for providing a coarse adjustment in the tension of said torsion member.

4. A torsion member clock as defined in claim 1 wherein said means for connecting the other end of said torsion wire to said spring support comprises a flange integrally formed at one end of said first portion of said spring extending away from and generally parallel to said second portion of said spring support, and an aperture formed midway between the sides of the first portion of said spring so that the other end of said torsion wire may be threaded through said aperture and connected to said flange for achieving a secure and uniform connection of the other end of the torsion wire to the spring support without tendency of the wire to be urged to the right or left of its axis.

5. A torsion member clock as defined in claim 1 wherein an enlarged opening is stamped in the second portion of said spring leaving a small semi-circular inwardly extending portion for receiving said threaded bushing, and wherein the axis of said threaded bushing is in a plane which equally divides each of the U-shaped decoupling sections so that the U-shaped sections permit the bushing and the inwardly extending semi-circular portion of said spring to remain parallel to the base member as the bushing is adjusted upwardly or downwardly.

References Cited

UNITED STATES PATENTS

| 1,948,104 | 2/1934 | Firestone et al. | |
|---|---|---|---|
| 2,815,477 | 12/1957 | Dunn et al. | 331—154 XR |
| 3,060,334 | 10/1962 | Faure | 310—38 |
| 3,137,992 | 6/1964 | Baumgartner | 58—131 XR |
| 3,161,813 | 12/1964 | DeWolf et al. | 318—138 |
| 3,176,171 | 3/1965 | Baumgartner | 310—36 XR |
| 3,008,070 | 11/1961 | Nemeth | 335—276 |

FOREIGN PATENTS 541,399    5/1957    Canada.

MILTON O. HIRSHFIELD, *Primary Examiner.*

D. F. DUGGAN, *Assistant Examiner.*

U.S. Cl. X.R.

58—23; 318—341; 331—154; 335—274